United States Patent
Terada

(10) Patent No.: US 9,422,652 B2
(45) Date of Patent: Aug. 23, 2016

(54) STRETCHABLE BULKY NONWOVEN FABRIC AND METHOD FOR MANUFACTURING SAME

(71) Applicant: Hirokazu Terada, Shiga (JP)

(72) Inventor: Hirokazu Terada, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 307 days.

(21) Appl. No.: 13/649,115

(22) Filed: Oct. 11, 2012

(65) Prior Publication Data
US 2013/0095288 A1 Apr. 18, 2013

(30) Foreign Application Priority Data
Oct. 12, 2011 (JP) ................................. 2011-225230

(51) Int. Cl.
*B32B 3/24* (2006.01)
*B32B 3/30* (2006.01)
(Continued)

(52) U.S. Cl.
CPC ................ *D04H 1/541* (2013.01); *B32B 5/022* (2013.01); *B32B 5/26* (2013.01); *B32B 7/045* (2013.01); *D04H 1/4374* (2013.01); *D04H 1/498* (2013.01); *D04H 1/50* (2013.01); *D04H 1/555* (2013.01); *B32B 3/263* (2013.01); *B32B 3/266* (2013.01); *B32B 3/28* (2013.01); *B32B 3/30* (2013.01); *B32B 5/04* (2013.01); *B32B 5/08* (2013.01); *B32B 7/02* (2013.01); *B32B 7/08* (2013.01); *B32B 37/0076* (2013.01); *B32B 37/1045* (2013.01); *B32B 37/144* (2013.01); *B32B 37/30* (2013.01); *B32B 2250/02* (2013.01); *B32B 2250/20* (2013.01); *Y10T 428/24322* (2015.01); *Y10T 428/24612* (2015.01);
(Continued)

(58) Field of Classification Search
USPC .......................................................... 442/358
See application file for complete search history.

(56) References Cited

U.S. PATENT DOCUMENTS 3,180,775 A * 4/1965 Sexsmith ............... D04H 1/642
156/182
5,618,610 A * 4/1997 Tomita ................. D04H 13/003
28/104

(Continued)

FOREIGN PATENT DOCUMENTS

CN 1323574 11/2001
CN 1514772 7/2004
(Continued)

OTHER PUBLICATIONS

Machine Translatino of JP 2007084958 A, Apr. 2007.*
(Continued)

*Primary Examiner* — Jeff Vonch
(74) *Attorney, Agent, or Firm* — Jianq Chyun IP Office

(57) ABSTRACT

To provide a stretchable bulky nonwoven fabric having a high bulkiness and a good feeling; wherein a first fibrous layer including fibers (1) is laminated with a second fibrous layer including heat fusible fibers (2) and having a MD shrinkage ratio lower by 5% or more than a MD shrinkage ratio of the first fibrous layer, the first fibrous layer and the second fibrous layer are integrated by entanglement between the fibers (1) included in the first fibrous layer and fibers (2) included in the second fibrous layer, the first fibrous layer is shrunk to form a structure in which the second layer is raised in the thickness direction, and sonic bond processing is applied from a side of the second fibrous layer.

6 Claims, 1 Drawing Sheet

(51) Int. Cl.

| | | |
|---|---|---|
| *B32B 5/04* | (2006.01) | |
| *B32B 5/26* | (2006.01) | |
| *B32B 7/04* | (2006.01) | |
| *B32B 7/08* | (2006.01) | |
| *B32B 37/14* | (2006.01) | |
| *B32B 37/30* | (2006.01) | |
| *D04H 1/50* | (2012.01) | |
| *D04H 1/555* | (2012.01) | |
| *D04H 1/541* | (2012.01) | |
| *B32B 5/02* | (2006.01) | |
| *D04H 1/498* | (2012.01) | |
| *D04H 1/4374* | (2012.01) | |
| *B32B 3/28* | (2006.01) | |
| *B32B 5/08* | (2006.01) | |
| *B32B 3/26* | (2006.01) | |
| *B32B 37/10* | (2006.01) | |
| *B32B 37/00* | (2006.01) | |
| *B32B 7/02* | (2006.01) | |

(52) U.S. Cl.
CPC . *Y10T 428/24661* (2015.01); *Y10T 428/24826* (2015.01); *Y10T 428/24942* (2015.01); *Y10T 428/249922* (2015.04)

(56) References Cited

U.S. PATENT DOCUMENTS

| | | | | |
|---|---|---|---|---|
| 5,789,328 | A * | 8/1998 | Kurihara | D04H 13/003 156/229 |
| 6,054,202 | A * | 4/2000 | Takeuchi | A47L 13/16 428/167 |
| 7,955,455 | B2 * | 6/2011 | Hanson | B32B 3/28 156/206 |
| 2002/0068150 | A1 * | 6/2002 | Taneichi | A61F 13/494 428/138 |
| 2003/0039807 | A1 * | 2/2003 | Groitzsch | A44B 18/0011 428/172 |
| 2003/0143376 | A1 * | 7/2003 | Toyoshima et al. | 428/156 |
| 2005/0197027 | A1 * | 9/2005 | Crane | B32B 5/022 442/382 |
| 2006/0243367 | A1 * | 11/2006 | Engelhart et al. | 156/62.6 |
| 2006/0264141 | A1 * | 11/2006 | Choi | D04H 1/565 442/358 |
| 2011/0004176 | A1 * | 1/2011 | Andersson et al. | 604/378 |
| 2011/0250390 | A1 * | 10/2011 | Terada et al. | 428/137 |
| 2011/0250816 | A1 * | 10/2011 | Fujiwara | B32B 5/26 442/358 |

FOREIGN PATENT DOCUMENTS

| | | | | |
|---|---|---|---|---|
| CN | 101205002 | | 6/2008 | |
| EP | 181300 A2 * | | 5/1986 | |
| EP | 0814189 | | 12/1997 | |
| JP | 61132666 A * | | 6/1986 | |
| JP | 02088058 A * | | 3/1990 | |
| JP | 02229253 A * | | 9/1990 | |
| JP | 05056902 A * | | 3/1993 | |
| JP | 05169575 A * | | 7/1993 | |
| JP | 06017361 A * | | 1/1994 | |
| JP | H07-54256 | | 2/1995 | |
| JP | 08158226 A * | | 6/1996 | D04H 1/48 |
| JP | H08-176947 | | 7/1996 | |
| JP | 08302553 A * | | 11/1996 | |
| JP | 09158022 A * | | 6/1997 | |
| JP | 10114004 A * | | 5/1998 | |
| JP | 10158966 A * | | 6/1998 | D04H 1/46 |
| JP | 2000234253 A * | | 8/2000 | |
| JP | 2002020957 A * | | 1/2002 | |
| JP | 2004169235 A * | | 6/2004 | |
| JP | 2004-202890 | | 7/2004 | |
| JP | 2007084958 A * | | 4/2007 | |
| JP | 2009-256856 | | 11/2009 | |
| WO | WO 9411560 A1 * | | 5/1994 | B32B 5/26 |
| WO | WO 2007041620 * | | 4/2007 | B32B 5/02 |

OTHER PUBLICATIONS

Machine Translation of JP 08158226 A, Jun. 1996.*
Machine Translation of JP 10158966 A, Jun. 1998.*
English Abstract for WO 9411560 A1, May 1994.*
"Office Action of China Counterpart Application", issued on Nov. 4, 2015, pp. 1-14, with English translation thereof.
"Office Action of China Counterpart Application" with English translation, issued on Apr. 28, 2016, pp. 1-12.

* cited by examiner

STRETCHABLE BULKY NONWOVEN FABRIC AND METHOD FOR MANUFACTURING SAME

CROSS-REFERENCE TO RELATED APPLICATION

This application claims the priority benefit of Japan patent application serial no. 2011-225230, filed on Oct. 12, 2011. The entirety of the above-mentioned patent application is hereby incorporated by reference herein and made a part of specification.

TECHNICAL FIELD

The present invention relates to a stretchable bulky nonwoven fabric and a method for manufacturing the nonwoven fabric.

BACKGROUND ART

A sheet is known as obtained by spinning an elastomer resin by a meltblown process, piling fibers obtained by spinning onto a conveyer, and then bonding between the fibers by means of heat rolls as a technique for obtaining a stretchable nonwoven fabric (see Patent literature No. 1, for example).

A three-dimensional sheet material or the like is also known, in which a first fibrous layer including 30% by mass or more of three-dimensionally crimped fibers is laminated with a second fibrous layer including three-dimensionally crimped fibers of a kind same with or different from the fibers in the first fibrous layer, both of the fibrous layers are partially bonded in a number of bonded parts to be integrated in a thickness direction, and the first fibrous layer is protruded between respective bonded parts to form a number of projections on a side of the first fibrous layer (see Patent literature No. 2, for example).

CITATION LIST

Patent Literature

Patent literature No. 1: JP 2009-256856 A.
Patent literature No. 2: JP 2004-202890 A.

SUMMARY OF INVENTION

Technical Problem

However, a sheet described in Patent literature No 1 has had a very low bulkiness. Therefore, the sheet has had a poor permeability and a damaged feeling. The sheet also has a problem of a poor surface smoothness due to friction specific to an elastomer resin used therein.

Moreover, a sheet material described in Patent literature No. 2 has been prepared by partially bonding both layers by heat embossing in advance, and then protruding sections between bonded parts by heat shrinking of a second fibrous layer. Therefore, a nonwoven fabric having a sufficiently high bulkiness has been quite difficult to obtain.

Accordingly, an objective of the present invention is to provide a stretchable bulky nonwoven fabric having a high bulkiness and a good feeling.

More specifically, the invention concerns a stretchable bulky nonwoven fabric, wherein a first fibrous layer including fibers (1) is laminated with a second fibrous layer including heat fusible fibers (2) and having a MD shrinkage ratio that is lower by 5% or more than a MD shrinkage ratio of the first fibrous layer, the first fibrous layer and the second fibrous layer are integrated by entanglement between the fibers (1) included in the first fibrous layer and the fibers (2) included in the second fibrous layer, the first fibrous layer is shrunk to have a structure in which the second fibrous layer is raised in a thickness direction, and sonic bond processing is partially applied from a side of the second fibrous layer.

The invention also concerns a method for manufacturing a stretchable bulky nonwoven fabric, comprising: laminating a first fibrous layer including fibers (1) and a second fibrous layer including heat fusible fibers (2) and having a MD shrinkage ratio that is lower by 5% or more than a MD shrinkage ratio of the first fibrous layer; integrating the first fibrous layer and the second fibrous layer by entanglement between the fibers (1) included in the first fibrous layer and the fibers (2) included in the second fibrous layer; shrinking the first fibrous layer to form a structure in which the second fibrous layer is raised in a thickness direction; and partially applying sonic bond processing from a side of the second fibrous layer.

Solution to Problem

The present inventors have diligently continued to conduct research for solving the problem, as a result, have found that a stretchable bulky nonwoven fabric having a high bulkiness and a good feeling can be obtained by laminating a first fibrous layer including fibers (1) and a second fibrous layer including heat fusible fibers (2) and having a MD shrinkage ratio that is lower than a MD shrinkage ratio of the first fibrous layer, and applying processing treatment, and thus have completed the invention based on the finding.

The invention has constitutions as described below.

[1] A stretchable bulky nonwoven fabric, wherein a first fibrous layer including fibers (1) is laminated with a second fibrous layer including heat fusible fibers (2) and having a MD shrinkage ratio that is lower by 5% or more than a MD shrinkage ratio of the first fibrous layer, the first fibrous layer and the second fibrous layer are integrated by entanglement between the fibers (1) included in the first fibrous layer and the fibers (2) included in the second fibrous layer, the first fibrous layer is shrunk to form a structure in which the second fibrous layer is raised in a thickness direction, and sonic bond processing is partially applied from a side of the second fibrous layer.

[2] The stretchable bulky nonwoven fabric according to [1], wherein the fibers (1) included in the first fibrous layer and the fibers (2) included in the second fibrous layer are partially entangled in an interface between the first fibrous layer and the second fibrous layer in a thickness direction of the nonwoven fabric.

[3] The stretchable bulky nonwoven fabric according to [1] or [2], including concave parts formed by sonic bond processing, and convex parts formed by sites being not subjected to the sonic bond processing.

[4] The stretchable bulky nonwoven fabric according to [3], wherein thickness of the convex parts is in the range of 1.0 to 5.0 mm.

[5] The stretchable bulky nonwoven fabric according to [3] or [4], having apertures obtained by removing sites forming thickness of the concave parts.

[6] A method for manufacturing a stretchable bulky nonwoven fabric, comprising: laminating a first fibrous layer including fibers (1) and a second fibrous layer including heat fusible fibers (2) and having a MD shrinkage ratio that is lower by 5% or more than a MD shrinkage ratio of the first fibrous layer; integrating the first fibrous layer and the second fibrous layer by entanglement between the fibers (1) included in the first fibrous layer and the fibers (2) included in the second fibrous layer; shrinking the first fibrous layer to form a structure in which the second fibrous layer is raised in a thickness direction; and partially applying sonic bond processing from a side of the second fibrous layer.

Advantageous Effects of Invention

A nonwoven fabric according to the invention has an excellent stretchability, and simultaneously a high bulkiness, concave and convex shape formed thereon, and also an excellent feeling.

DESCRIPTION OF EMBODIMENTS

Figure 1:
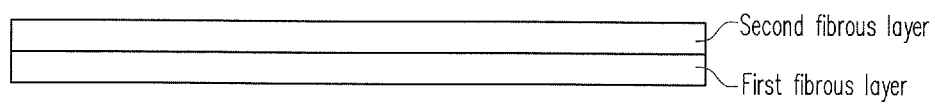
FIGS.1-3 illustrate a method for manufacturing a stretchable bulky nonwoven fabric according to an embodiment of the invention.

In the invention, "MD" is an abbreviation of Machine Direction and means a direction of nonwoven fabric production line. Moreover, "CD" is an abbreviation of Cross Direction and means a direction perpendicular to the machine direction.

In the invention, "MD shrinkage ratio" means a ratio of shrinkage in MD as caused by development of crimps when a web having a unit weight of $100$ g/m$^2$ is prepared from fibers, and the web is subjected to heat treatment in an oven at 120° C. for 5 minutes.

The invention provides a stretchable bulky nonwoven fabric, wherein a first fibrous layer including fibers (1) is laminated with a second fibrous layer including heat fusible fibers (2) and having a MD shrinkage ratio that is lower by 5% or more than a MD shrinkage ratio of the first fibrous layer, the first fibrous layer and the second fibrous layer are integrated by entanglement between the fibers (1) included in the first fibrous layer and the fibers (2) included in the second fibrous layer, the first fibrous layer is shrunk to form a structure in which the second fibrous layer is raised in a thickness direction, and sonic bond processing is partially applied from a side of the second fibrous layer.

First Fibrous Layer

The fibers (1) included in the first fibrous layer preferably show a high shrinkage ratio by development of crimps and cause no bonding of fibers with each other by heat fusion of the fibers in a shrinking processing process using a heating processing machine or the like.

The MD shrinkage ratio of the fibers (1) is preferably 40% or more, further preferably, 50% or more, still further preferably, 65% or more.

If the MD shrinkage ratio is 40% or more, a sufficient stretchability can be provided for a rugged stretchable nonwoven fabric that is finally obtained, and generation of sufficient convex parts is easy obtained. Moreover, the fibers (1) are not bonded with each other under a temperature of shrinking processing of the fibers (1).

Even if the fibers (1) are potentially crimpable conjugate fibers, and show a high shrinkage ratio originally, when bonding of the fibers with each other is simultaneously caused, the fibers are immobilized by the bonding. Therefore, shrinking movement, namely, development of potential crimps is adversely affected, and a sufficient shrinkage is not obtained.

Thus, stretchability of the first fibrous layer comes to be small. Moreover, the fibers are immobilized each other. Therefore, a strong tensile force is needed upon stretching or the like, as a result, a high stretching performance is not obtained and feeling is decreased.

Specific examples of the fibers (1) include side-by-side type conjugate fibers or eccentric sheath-core type conjugate fibers.

For the side-by-side type conjugate fibers, polypropylene or polyester is preferably used as a high-melting point component. Moreover, as a low-melting point component, a resin including such a copolymer is preferably used as an ethylene-propylene binary copolymer, a propylene-butene-1 binary copolymer, an ethylene-propylene-butene-1 ternary copolymer, a propylene-hexene-1 binary copolymer or a propylene-octene-1 binary copolymer, or a mixture of the copolymers.

For the eccentric sheath-core type conjugate fibers, the low-melting point component is preferably used on a sheath side, and the high-melting point component is preferably used on a core side.

In view of heat shrinkage at a low temperature and cost, the ethylene-propylene binary copolymer preferably has the ethylene content in the range of 4 to 10% by mass, and the propylene content in the range of 90 to 96% by mass. Moreover, the ethylene-propylene-butene-1 ternary copolymer preferably has the ethylene content in the range of 1 to 7% by mass, the propylene content in the range of 88 to 98% by mass, and the 1-butene content in the range of 1 to 5% by mass.

A melting point of the low-melting point component of the fibers (1) is preferably in the range of 128° C. to 160° C., further preferably, in the range of 130° C. to 150° C. If the melting point is 128° C. or higher, the resin on a side of the low-melting component is not melted below the temperature of shrinking processing of the fibers (1), therefore, decrease in stretching performance due to the bonding of the fibers with each other does not occur.

A melt mass flow rate {a value measured under testing condition M in JIS K7210 (1999)} of the low-melting point component is preferably in the range of 0.1 to 80 g/10 min, further preferably, in the range of 3 to 40 g/10 min in view of spinnability and processability.

As the high-melting point component, a crystalline polypropylene can be utilized, such as a propylene homopolymer or a copolymer of propylene with a small amount, ordinarily, 2% by mass or less, of ethylene or an α-olefin. Specific examples of such a crystalline polypropylene include a crystalline polypropylene obtained using a general-purpose Ziegler-Natta catalyst or a metallocene catalyst.

A melting point of the high-melting point component is preferably in the range of 150° C. to 165° C., further preferably, in the range of 155° C. to 160° C. If the melting point is 150° C. or higher, a difference in a melting point from the melting point of the low-melting point component can be sufficiently ensured, therefore, it comes to be possible to select a processing temperature during the shrinking processing from wide range of temperature.

A melt mass flow rate {a value measured under testing condition M in JIS K7210 (1999)} of the high-melting point component is preferably in the range of 0.1 to 80 g/10 min, further preferably, in the range of 3 to 40 g/10 min in view of spinnability and processability.

The polyester may be used as the high-melting point component in order to further expand the difference in the melting point from the melting point of the low-melting point component. Specific examples of the polyester include polyethylene terephthalate, polybutyrene terephthalate, or a copolymer of ethylene terephthalate and butyrene terephthalate.

A fineness of the fibers (1) is preferably in the range of 1.0 to 20 dtex, further preferably, in the range of 1.5 to 10 dtex, still further preferably, 2.2 to 7.0 dtex. If the fineness is 1.0 dtex or more, when the fibers (1) pass through a curding process, neither neps are generated nor texture is disordered, nor a processing speed is decreased, for example. If the fineness is 20 dtex or less, crimp development properties of the fibers (1) are satisfactorily maintained, and a shrinkage ratio of 40% or more is easily obtained.

The fineness of fibers can be determined, for example, by measuring a fiber diameter by means of an electron microscope or an optical microscope, and measuring density of the fibers using a density gradient tube or a balance for measuring the density, and then calculating the fineness according to an equation: $\{\text{diameter } (\mu m)\}^2 \div 4 \times \pi \times \{\text{density } (g/cm^3)\} \div 100 = \{\text{fineness (dtex)}\}$. The fineness can also be determined by calculating the fineness according to an equation: $10,000 \times \{\text{weight of fibers at L (m)}\} \div L(m) = \{\text{fineness (dtex)}\}$ using JIS L0104 (2000). The fineness of the fiber can be measured according to a method publicly known so far as the above.

Moreover, an actual fiber length of the fibers (1) is preferably in the range of 10 mm to 150 mm, further preferably, in the range of 25 mm to 65 mm. When the actual fiber length of the fibers (1) is over 150 mm, the neps inside a curding machine are generated and the texture is decreased. When the actual fiber length of the fibers (1) is below 10 mm, fibers drop out from the fibrous layer in the carding process, therefore, productivity is decreased.

"Actual fiber length of the fibers" means an actual length of crimped fibers, and corresponds to a length when the crimps are stretched without applying stress to the fibers. The actual fiber length of the fibers can be determined by measuring one fiber from one end to the other end along the fiber by means of a commercially available apparatus (a microscope with an image analysis function, such as a digital microscope made by KEYENCE Corporation).

However, if a ratio is within the range in which the shrinkage ratio can be maintained, other shrinkable fibers having fineness outside the range of the fineness described above may be mixed and used. Moreover, fibers other than the fibers (1) may be mixed into the first fibrous layer in the range in which advantageous effects of the invention are not considerably adversely affected.

The fibers (1) may be short fibers, or long fibers as obtained according to a spunbond method or a meltblown method. In the case of the short fibers, a fiber length is not particularly limited, but is preferably in the range of 20 to 100 mm.

A temperature showing a maximum shrinkage ratio of the first fibrous layer is preferably in the range of 135 to 160° C.

Although a preferred range depends on a diameter of constitutional fibers, a unit weight of the first fibrous layer is preferably in the range of 5 to 50 g/m$^2$, further preferably, in the range of 10 to 30 g/m$^2$.

Second Fibrous Layer

The second fibrous layer includes the heat fusible fibers (2). The heat fusible fibers (2) preferably show a value of the MD shrinkage ratio lower than a value of the MD shrinkage ratio of the fibers (1) included in the first fibrous layer.

However, if a ratio is within the range in which strength of the second fibrous layer is not decreased, thermally non-bondable fibers such as pulp may be mixed and used. When the thermally non-bondable fibers are mixed into the second fibrous layer, a ratio of the thermally non-bondable fibers based on the total of the second fibrous layer is preferably in the range of 10 to 80% by mass, further preferably, in the range of 30 to 70% by mass.

The MD shrinkage ratio of the heat fusible fibers (2) is preferably 35% or less, further preferably, 25% or less.

If the MD shrinkage ratio is 35% or less, a difference in shrinkage between the first fibrous layer and the second fibrous layer can be significantly ensured. Therefore, convex projections are easily formed in a shrinking treatment process. In the invention, in particular, heat fusible fibers (2) having a MD shrinkage ratio of 5% or less are designated as non-shrinkable fibers (2B), and heat fusible fibers (2) having a MD shrinkage ratio more than 5% are designated as fibers (2A).

As the heat fusible fibers (2), conjugated fibers including a first component and a second component can be utilized, in which the second component has a melting point lower than a melting point of the first component, or has a softening point lower than a softening point of the first component, for example. As a conjugate form of the conjugate fibers, side-by-side type, eccentric sheath-core type or concentric sheath-core type conjugate fibers can be utilized. In the side-by-side type conjugate fibers, both of the first component and the second component constitute at least a part of a surface of fibers in a length direction. In the eccentric sheath-core type conjugate fibers, the second component constitutes a sheath component, and the first component constitutes a core component, and the sheath component and the core component are eccentrically arranged. In the concentric sheath-core type conjugate fibers, the second component constitutes a sheath component, and the first component constitutes a core component, and the sheath component and the core component are concentrically arranged. As the first component, polypropylene or polyester can be used. As the second component, at least one kind selected from LDPE, LLDPE, and a thermoplastic elastomer can be used.

A fineness of the heat fusible fibers (2) is preferably in the range of 1.0 to 20 dtex, further preferably, in the range of 1.5 to 10 dtex, still further preferably, 2.2 to 7.0 dtex.

If the non-shrinkable fibers (2B) have heat fusible properties and a MD shrinkage ratio of substantially 0 (zero) when a web having a unit weight of 100 g/m$^2$ is prepared from the non-shrinkable fibers (2B) and the web is subjected to heat treatment in an oven at 120° C. for 5 minutes, the non-shrinkable fibers (2B) may be single component fibers including polyolefin or polyester.

Specific examples of the thermoplastic elastomer include a hydrogenated styrene-based elastomer (SEBS) or thermoplastic polyurethane (TPU). An olefin-based elastomer is preferably used in view of compatibility.

Specific examples of the olefin-based elastomer include an ethylene-propylene rubber (EPR), an ethylene-propylene-non-conjugated diene copolymer rubber (EPDM) or an ethylene-octene-1 copolymer (Engage 8402 made by The Dow Chemical Company).

One kind or a mixture of two or more kinds of the thermoplastic elastomers can be used, and the elastomer can also be mixed with LDPE or LLDPE and used. In addition, any other resin or an additive such as a slipping agent or an inorganic substance including a pigment, calcium carbonate or titanium oxide may be included in the range in which advantageous effects of the invention are not adversely affected.

When the heat fusible fibers (2) are the conjugate fibers, the heat fusible fibers (2) have a heat fusible performance caused by heat fusion or softening of the second component as a conjugate component.

In particular, if the thermoplastic elastomer is used for fibers in the second fibrous layer, bonding between the fibers is further reinforced by a sticking effect of the thermoplastic elastomer, and simultaneously bonding points per se after the bonding exhibits a rubber-elastic behavior. Thus, stretchability of a nonwoven fabric is preferably improved.

A melting point or a softening point of the second component is preferably in the range of 70° C. to 130° C., further preferably, in the range of 95° C. to 125° C. If the melting point or the softening point is 70° C. or higher, neither the neps (fusion of fibers) due to carding friction by a metallic wire, or the like is generated in the carding process for preparing the web, nor the texture is disordered. Moreover, if the melting point or the softening point is 130° C. or lower, the fibers (1) used for the first fibrous layer are not melted on a low-melting point component side, and the fibers are not bonded with each other. Therefore, the feeling is soft and the stretchability can be kept.

In the invention, a melting point of the heat fusible fibers (2) is preferably lower than a melting point of the fibers (1) in view of shrinking and the feeling. Specifically, a melting point of a component constituting the heat fusible fibers (2) and having a lowest melting point in fibers (2) is preferably lower by 5 to 50° C., further preferably, by 15 to 35° C. than a melting point of a component constituting the fibers (1) and having a lowest melting point in fibers (1).

A melt mass flow rate {a value measured under testing condition M in JIS K7210 (1999)} of the heat fusible fibers (2) is preferably in the range of 0.1 to 80 g/10 min, further preferably, in the range of 3 to 40 g/10 min in view of spinnability and processability.

As the first component of the heat fusible fibers (2), a crystalline polypropylene can be utilized, such as a propylene homopolymer or a copolymer of propylene with a small amount, ordinarily, 2% by mass or less, of ethylene or an α-olefin. Specific examples of such a crystalline polypropylene include a crystalline polypropylene obtained using a general-purpose Ziegler-Natta catalyst or a metallocene catalyst.

A melting point of the first component is preferably in the range of 150° C. to 165° C., further preferably, 155° C. to 160° C. If the melting point is 150° C. or higher, a difference in a melting point from a melting point of the second component can be sufficiently ensured, and a processing temperature range during the shrinking processing is increased.

A melt mass flow rate {a value measured under testing condition M in JIS K7210 (1999)} of the first component is preferably in the range of 0.1 to 80 g/10 min, further preferably, in the range of 3 to 40 g/10 min in view of spinnability and processability.

In order to further expand the difference in the melting point from the melting point of the second component, the polyester may be used as the first component. Specific examples of the polyester include polyethylene terephthalate, polybutyrene terephthalate, or a copolymer of ethylene terephthalate and butyrene terephthalate.

The heat fusible fibers (2) may be short fibers, or long fibers as obtained according to the spunbond method or the meltblown method. In the case of the short fibers, an actual fiber length is not particularly limited, but is preferably in the range of 20 to 100 mm.

Although a preferred range depends on a diameter of constitutional fibers, a unit weight of the second fibrous layer is preferably in the range of 7 to 50 g/m², further preferably, in the range of 10 to 30 g/m².

Manufacturing Method

Figure 2:
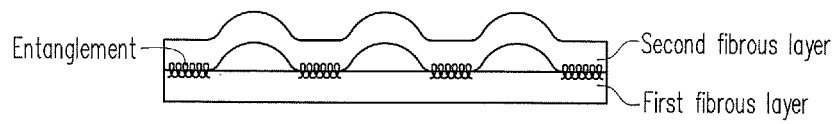
Figure 3:
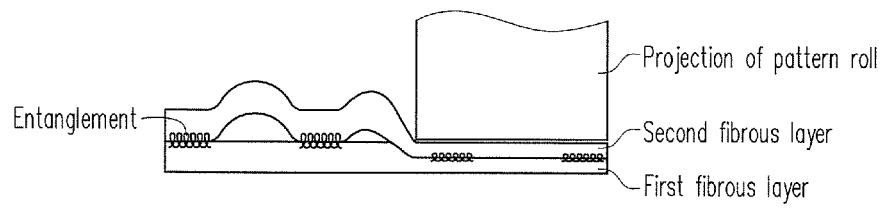

The stretchable bulky nonwoven fabric of the invention can be manufactured by laminating the first fibrous layer including the fibers (1) and the second fibrous layer including the heat fusible fibers (2) and having the MD shrinkage ratio that is lower by 5% or more than the MD shrinkage ratio of the first fibrous layer, as shown in FIG. 1, integrating both layers by the entanglement between the fibers (1) included in the first fibrous layer and the fibers (2) included in the second fibrous layer and shrinking the first fibrous layer to form a structure in which the second fibrous layer is raised in a thickness direction, as shown in FIG. 2, and partially applying the sonic bond processing from the side of the second fibrous layer, as shown in FIG. 3.

Specifically, the stretchable bulky nonwoven fabric of the invention is obtained, for example, by integrating a first fibrous layer including the fibers (1) and a second fibrous layer including the heat fusible fibers (2) (formation of the nonwoven fabric), shrinking the first fibrous layer (shrinking processing), and then partially applying the sonic bond processing from the side of the second fibrous layer.

(Formation of the nonwoven fabric, and shrinking processing)

The stretchable bulky nonwoven fabric of the invention is obtained by applying the sonic bond processing to a nonwoven fabric in which the first fibrous layer and the second fibrous layer are integrated by the entanglement between the fibers in both layers, and the first fibrous layer is shrunk to form the structure in which the second fibrous layer is raised in the thickness direction.

Upon integrating the first fibrous layer and the second fibrous layer (formation of the nonwoven fabric) and shrinking the first fibrous layer (shrinking processing), both layers may be integrated by the entanglement between the fibers in both layers, and then the first fibrous layer may be shrunk to raise the second fibrous layer in the thickness direction, or the formation of the nonwoven fabric and the shrinking processing may be simultaneously performed.

Specifically, for example, the fibers are processed into a web having a unit weight of 100 g/m². When the web is subjected to heat treatment in an oven at 120° C. for 5 minutes, helical crimps are developed. Thus, fibers having a MD shrinkage ratio of 40% or more, further preferably, 50% or more, still further preferably, 65% or more are used as the fibers (1) in the first fibrous layer. If the shrinking processing is performed by increasing a temperature to a level in which the helical crimps are developed in the fibers (1), or to a higher level, the fibers (1) around an interface between the first fibrous layer and the second fibrous layer develop the helical crimps and shrink so as to tangle the fibers in the second fibrous layer around an identical interface. Therefore, the fibers (1) included in the first fibrous layer and the fibers (2) included in the second fibrous layer are entangled effectively at a partial area in thickness direction of both layers, wherein said partial area is around the interface between both layers. More specifically, the formation of the nonwoven fabric (integrating process of the first fibrous layer and the second fibrous layer) and shrinking process are simultaneously achieved according to the method described above. Thus, a working process can be significantly simplified without needing to carry out each process, individually.

Thus, the first fibrous layer and the second fibrous layer are laminated and integrated by the entanglement between the fibers in both layers. However, from a viewpoint of particularly preventing delamination of both layers, contact points of the fibers in both layers are preferably bonded in entangled parts by heat fusion of the heat fusible fibers included in the second fibrous layer. In order to achieve such bonding, the shrinking processing may be performed at a temperature in which the fibers (1) in the first fibrous layer develop the helical crimps and the fibers (2) of the second fibrous layer cause heat fusion.

Specifically, the first fibrous layer including the fibers (1) is formed as a lower layer and the second fibrous layer including the heat fusible fibers (2) is formed as an upper layer, and the first fibrous layer and the second fibrous layer are laminated and heated. Thus, shrinking of the lower layer and the formation of the nonwoven fabric of the upper layer and the lower layer can be simultaneously executed. Such a method is preferred.

Herein, the reason is that the second fibrous layer including the fibers (2) is formed as the upper layer, and thus the second fibrous layer including the fibers (2) can be formed as a layer having no contact with a conveyor of heat processing machine such as a dryer, therefore, the shrinking processing can be satisfactorily performed. In the interface between the upper layer and the lower layer, the lower layer is significantly shrunk while the upper layer is randomly bonded with the lower layer during the shrinking processing by heating, the fibers in the interface are entangled, and thus the nonwoven fabric is formed.

For the shrinking processing, such a dryer can be used as a pin tenter dryer, a shrink dryer to be used for drying a towel, a fabric or the like, a floating dryer, a horizontal drum dryer, a convection dryer (oven). Among types of the dryers, a conveyer dryer that is widely used for the nonwoven fabric according to the carding process can be suitably used. Hot air is generally used as a heating system, but heating by a vapor, infrared light, microwaves or heat roll contact may be allowed.

When hot air is used as the heating system, a heating period of time is ordinarily preferably in the range of 3 to 10 seconds, and a wind speed can be ordinarily adjusted in the range of 0.8 to 1.4 meters per second, but the conditions are not limited thereto.

The stretchable bulky nonwoven fabric obtained by integrating the first fibrous layer and the second fibrous layer (formation of the nonwoven fabric) and shrinking the first fibrous layer (shrinking processing) has the structure in which the second fibrous layer is raised in the thickness direction between the entanglements by shrinking of the first fibrous layer.

The raises are developed in a dense and irregular manner as a result of development of the helical crimps of the fibers (1). The raises are different from raises described in Patent literature No. 2 as obtained by partially thermal compression bonding a non-shrinkable fibrous web and a shrinkable monocomponent fibrous web by means of embossing rolls (having a regular embossing pattern) to allow thermal shrinking sections between relevant embossed parts.

As is different from the nonwoven fabric according to the carding process, the second fibrous layer in the present invention has, in the raised parts, an enhanced arrangement of the fibers in the thickness direction of the nonwoven fabric and has a high bulkiness and excellent properties.

(Sonic Bond Processing)

The stretchable bulky nonwoven fabric of the invention is obtained by partially applying the sonic bond processing from the side of the second fibrous layer to the nonwoven fabric having the structure in which the second fibrous layer is raised.

The sonic bond processing is referred also to as ultrasonic welding processing. The sonic bond processing is a processing method for applying to a member an ultrasonic vibration having a frequency of approximately 15 to approximately 50 kHz together with pressure, and bonding the members using the resultant frictional heat. In manufacturing the stretchable bulky nonwoven fabric of the invention, a publicly known apparatus that is ordinarily used for the purpose of bonding the fibrous layers and conditions therefor may be appropriately applied, and are not particularly limited.

For the sonic bond processing, a handy type ultrasonic welder may be used, and industrially, an apparatus including a pair of a pattern roll and an ultrasonic horn may be used. In the apparatus including a pair of the pattern roll and the ultrasonic horn, the nonwoven fabric is melted and bonded by the ultrasonic vibration generated from the ultrasonic horn. Ultrasonic waves from the ultrasonic horn resonate only with projected parts of paired pattern rolls to strongly give the ultrasonic vibration to the nonwoven fabric. Therefore, the nonwoven fabric in recesses of the pattern roll is conversely not melted and bulkiness can be kept. Thus, sonic bonded parts are partially formed on the fibrous layer.

In the sonic bond processing, a boundary between thermally bonded parts and thermally non-bonded parts is more clearly formed as compared with thermal embossing. In a process for manufacturing the stretchable bulky nonwoven fabric of the invention, both layers are integrated only by the entanglement between the fibers in a contact interface between the first fibrous layer and the second fibrous layer, and the second fibrous layer is raised on the side of the secondary fibrous layer between the entanglements, and thus the fibers in the raised second fibrous layer have high arrangement properties toward the thickness direction of the nonwoven fabric.

Therefore, if the sonic bond processing is partially applied from above of the second fibrous layer to the nonwoven fabric having the structure in which the second fibrous layer is raised in the thickness direction between the entanglements, a boundary is more clearly developed between ultrasonic non-irradiated sites and ultrasonic irradiated sites in which the nonwoven fabric is melted and thickness of the nonwoven fabric is decreased, as compared with a case where the fibers are arranged in the "length" direction of the nonwoven fabric. More specifically, the stretchable bulky nonwoven fabric can be obtained in which design patterns formed using patterns of bonded parts and non-bonded parts are clearly visible.

On the other hand, if non-embossed sites are shrunk and raised after applying the thermal embossing in advance, the non-embossed sites are gradually raised from a boundary with the embossed parts to form dome-shaped raises. In the design patterns developed by the bonded parts and the non-bonded parts, shapes of the original design patterns cannot be reproduced so precisely as the design patterns of the nonwoven fabric of the invention, and a contour having outstanding clearness is not produced.

Patterns (projections) of the pattern roll in the sonic bond processing are not particularly limited. Specific examples include round, rhombic or rectangular patterns or pictures. Among types of the patterns, dot patterns such as round and rhombic dot patterns are preferred in order to obtain the stretchability and the bulkiness. Moreover, an arrangement of the patterns (projections) of the pattern roll is preferably a staggered arrangement.

The patterns (projections) of the pattern roll produce concave parts of the stretchable bulky nonwoven fabric, namely, the bonded parts thereof. Therefore, an increase in the bonded parts tends to decrease the stretchability. Thus, an area ratio of the concave parts (bonded parts) in the whole of the stretchable bulky nonwoven fabric is preferably in the range of 3 to 60%, further preferably, in the range of 10 to 30%. If the area ratio of the concave parts is in the range of 3% to 60%, the stretchability becomes favorable and such an area ratio is preferred.

In addition, an expression "partially applying the sonic bond processing" means formation of the concave parts at an area ratio less than 100%, preferably, in the range of 3 to 60%, further preferably, in the range of 10 to 30%.

In the sonic bond processing, an amount of ultrasonic vibration given to the stretchable bulky nonwoven fabric can be controlled by ultrasonic wave power generated from the ultrasonic horn. Therefore, the ultrasonic vibration given with a high power excessively melts the concave parts of the stretchable bulky nonwoven fabric and completely melts away the concave parts, and sites corresponding to the concave parts can also be opened to form apertures. Thus, a stretchable bulky nonwoven fabric having an excellent stretchability, a good feeling, a high bulkiness and having apertures can be efficiently manufactured.

Stretchable Bulky Nonwoven Fabric

In the stretchable bulky nonwoven fabric of the invention, the first fibrous layer and the second fibrous layer are integrated by the entanglement between the fibers included in the first fibrous layer and the fibers included in the second fibrous layer. Herein, an expression "integrated by the entanglement" refers to a state in which the fibers included in the first fibrous layer and the fibers included in the second fibrous layer are entangled with each other and both layers are integrated. The expression does not include an embodiment in which the fibrous layers are integrated by thermocompression bonding processing such as the thermal embossing.

Preferably, in the stretchable bulky nonwoven fabric of the invention, the fibers (1) included in the first fibrous layer and the fibers (2) included in the second fibrous layer are entangled at partial area in the thickness direction. That means they are entangled in the interface between both layers in the thickness direction of the nonwoven fabric. More specifically, as compared with a case where the fibers included in the first fibrous layer and the fibers included in the second fibrous layer are entangled over an entire thickness of the nonwoven fabric, it is preferable that the fibers included in both layers are partially entangled, namely, entangled in the interface between both layers.

Thus, an influence due to fibers in other layers is limited to a partial level in each layer, and performance derived from the fibers originally constituting each layer is easily developed.

In addition, "interface" described above means the boundary in which the first fibrous layer and the second fibrous layer are contacted with each other. Herein, the term "interface" is used so as to express a state in which the first fibrous layer and the second fibrous layer are integrated by the entanglement between the fibers constituting the layers, respectively, but the fibers are not completely mixed with each other.

In the stretchable bulky nonwoven fabric of the invention, the second fibrous layer has the MD shrinkage ratio lower by 5% or more than the MD shrinkage ratio of the first fibrous layer, and the first fibrous layer is shrunk to form the structure in which the second fibrous layer is raised in the thickness direction. The reason is that, if a difference in the MD shrinkage ratio between the first fibrous layer and the second fibrous layer is less than 5%, an irregularly folded structure is not obtained in which the second fibrous layer is raised on the side of the second fibrous layer between respective entangled parts, and folded in the running direction of the nonwoven fabric.

In the stretchable bulky nonwoven fabric of the invention, both layers are integrated only by the entanglement between the fibers in the contact interface between the first fibrous layer and the second fibrous layer, the first fibrous layer is shrunk and the second fibrous layer is raised on the side of the secondary fibrous layer between the entanglements. Thus, the fibers in the raised second fibrous layer have the high arrangement properties toward the thickness direction of the nonwoven fabric.

Therefore, the sonic bond processing is partially applied from the side of the second fibrous layer. Thus, as compared with the thermal embossing, the boundary between the thermally bonded parts and the thermally non-bonded parts is more clearly formed, and the stretchable bulky nonwoven fabric is formed in which the design patterns formed using the patterns of the bonded parts and the non-bonded parts are clearly visible.

The stretchable bulky nonwoven fabric of the invention is partially subjected to the sonic bond processing, and preferably includes the concave parts formed by the sonic bond processing, and sites being not subjected to the sonic bond processing. In addition, the area ratio of the concave parts is less than 100%, preferably, in the range of 3 to 60%, further preferably, in the range of 10 to 30%.

The thickness of the convex parts formed by the sonic bond processing is preferably in the range of 1.0 to 5.0 mm, further preferably, in the range of 1.5 to 3.5 mm. When the thickness of the convex parts is 1.0 mm or more, the stretchable bulky nonwoven fabric of the invention has a high bulkiness and an excellent feeling. Moreover, when the thickness of the convex parts is 5.0 mm or less, the stretchable bulky nonwoven fabric of the invention has an excellent flexibility.

The concave parts formed by the sonic bond processing are preferably excessively melted and removed the sites forming the thickness of the concave parts and open into the nonwoven fabric. Thus, the stretchable bulky nonwoven fabric having a high bulkiness, an excellent stretchability and an excellent feeling, and having apertures can be produced.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

In the following, the invention will be explained in greater detail by way of Examples, but the invention is in no way limited to the Examples.

Resin (1) Polypropylene homopolymer: A melting point of 160° C., a melt mass flow rate {testing condition M, JIS K7210 (1999)} of 15 g/10 min.

(2) Ethylene-propylene copolymer: An ethylene content of 4% by mass, a melting point of 130° C., and a melt mass flow rate {testing condition M, JIS K7210 (1999)} of 16 g/10 min.

(3) LDPE: Petrothene 350 (trade name) made by Tosoh Corporation, a melting point of 105° C., and a melt mass flow rate {testing conditions D, JIS K7210 (1999)} of 23 g/10 min.

(4) Olefin-based elastomer: ENGAGE 8402 (trade name) made by The Dow Chemical Company, a melting point of 100° C., a melt mass flow rate {testing condition D, JIS K7210 (1999)} of 20 g/10 min.

(5) HDPE: S6900 (trade name) made by Keiyo Polyethylene Co., Ltd., a melting point of 130° C., and a melt mass flow rate {testing condition D, JIS K7210 (1999)} of 16 g/10 min.

Fibers

Fibers (1) are potentially crimpable heat fusible conjugate fibers including an ethylene-propylene copolymer of resin (2) and a polypropylene homopolymer of resin (1), and having side-by-side cross-sections (mass ratio: 50/50), a fineness of 2.2 dtex and a fiber length of 51 mm. A MD shrinkage ratio of the fibers (1) was 73.5%.

Fibers (2A) are potentially crimpable heat fusible conjugate fibers including a LDPE of resin (3) and a polypropylene homopolymer of resin (1), and having side-by-side cross-sections (mass ratio: 50/50), a fineness of 2.2 dtex and a fiber length of 51 mm. A MD shrinkage ratio of the fibers (2A) was 20.5%.

Non-shrinkable fibers (2B-1) are heat fusible conjugate fibers having concentric sheath-core cross-sections (mass ratio: 50/50) in which an olefin-based elastomer resin of resin (4) is arranged in a sheath, and a polypropylene homopolymer of resin (1) is arranged in a core, and having a fineness of 2.2 dtex and a fiber length of 51 mm. A MD shrinkage ratio of the fibers (2B-1) was 1.3%.

Non-shrinkable fibers (2B-2) are heat fusible conjugate fibers having concentric sheath-core cross-sections (mass ratio: 50/50) in which a HDPE of resin (5) is arranged in a sheath, and a polypropylene homopolymer of resin (1) is arranged in a core, and having a fineness of 2.2 dtex and a fiber length of 51 mm. A MD shrinkage ratio of the fibers (2B-2) was 0.3%.

Preparation of a Laminated Fibrous Layers

A fibrous layer having a unit weight of 10 g/m² was prepared from the fibers described in a column of the Fibers by using a miniature carding machine made by Daiwa-kiko corporation Ltd. Subsequently, a laminated fibrous layers having a unit weight of 20 g/m² was prepared by laminating the fibers (2A) or the non-shrinkable fibers (2B) on a first fibrous layer including the fibers (1).

Shrinking Processing and Formation of a Nonwoven Fabric

A nonwoven fabric was obtained by passing the laminated fibrous layers obtained in the Preparation of the laminated fibrous layers through a hot-air circulation heat treatment machine under processing conditions of a hot-air temperature of 125° C., a wind speed of 0.5 m/s, a conveyer speed of 12.5 m/min, and 3 seconds.

Sonic Bond Processing

Sonic bond processing was performed by applying ultrasonic waves to a nonwoven fabric at an ultrasonic horn power of 15% (maximum power: 150 W, oscillation frequency: 48.5 kHz) for 0.4 second by using an ultrasonic welder (Sonopet-150K) made by Seidensha Electronics Co., Ltd.

Thermal Embossing

Thermal embossing was performed under processing conditions of a processing temperature of 115° C., a processing speed of 6 m/min, a line pressure of 20 kg/cm, and a clearance of 0.01 mm.

Measurement of Thickness

A pressure of 343.2 Pa (3.5 g/cm²) was applied to a nonwoven fabric cut into a strip having a dimension of 15 cm×15 cm by means of a pressure applicator having a diameter of 35 mm (load). Thickness at applying the pressure was measured using Digithickness Tester made by Toyo Seiki Co., Ltd.

Measurement of a Shrinkage Ratio of a Fibrous Layer (Monolayer Web)

A miniature carding machine made by Daiwa-kiko corporation Ltd. was used, and 100 g of opened original fibers to be used were introduced into a width of 30 cm in a central part of an introduction conveyor of the carding machine, and the total amount of the fibers was wound under a doffer speed of 7.0 plus/minus 0.2 meter per minute and a speed of 7.3 plus/minus 0.2 meter per minute using a winding drum having a circumference of 145 cm, wound fibers were cut by using scissors or the like, and thus a fibrous layer having a dimension of approximately 25 cm×approximately 25 cm was obtained.

The fibrous layer having the dimension of approximately 25 cm×approximately 25 cm was sandwiched between kraft paper sheets, and treated for 5 minutes by using a convection dryer made by SANYO Electric Co., Ltd and set at 120° C., and then the fibrous layer was removed, and a MD length was measured and a MD shrinkage ratio of a fibrous layer was calculated according to an equation described below.

MD shrinkage ratio of a fibrous layer={length (cm) before heat treatment−length (cm) after heat treatment}/{length (cm) before heat treatment}×100(%).

Measurement of a Shrinkage Ratio of a Laminated Fibrous Layers

The laminated fibrous layers obtained in the Preparation of the laminated fibrous layers described above was cut out into 1,000 mm in MD and 300 mm in CD, heat treatment was performed under conditions described in the Shrinking processing and formation of the nonwoven, a MD length (a) and a CD length (b) were measured, and a shrinkage ratio was determined according to an equation described below.

MD shrinkage ratio (%)={1,000−(a)}/1,000×100.

CD shrinkage ratio (%)={300−(b)}/300×100.

Measurement of Tensile Strength

"Autograph AG500D" made by Shimadzu Corporation was used. After a sample was elongated by 50% from a sample length of 100 mm at a testing speed of 100 meters per minute, the sample was returned to a length of the sample length, and then a load during elongating the sample by 50% again was measured. Strength at an elongation of 10%, 20%, 30%, 40% and 50% was measured in two points of initial elongation (first time) and restart elongation (second time), and a graph (S-S curve) was prepared by taking strength as a vertical axis and strain as a horizontal axis.

As a difference between the load at the initial elongation and the load at restart elongation is larger, the stretchability was judged to be lower. Moreover, as an inclination is higher in the graph of the elongation and the load, flexibility was judged to be lower and feeling to be inferior.

Observation of Structure of a Nonwoven Fabric

A nonwoven fabric was cut substantially vertically, and a cross-section was observed by means of a digital microscope (VHX-900) made by KEYENCE Corporation and a state of each constitutional fibrous layer, a status of entanglement and thermal bonding between the fibers, or the like was observed.

Example 1

A fibrous layer including fibers (1) and a fibrous layer including fibers (2A) both as described in the Fibers above were prepared, and laminated to prepare a laminated fibrous layers, and a nonwoven fabric was prepared under conditions described in the Shrinking processing and formation of the nonwoven fabric. The fibers (1) developed a helical crimp to be significantly shrunk, and the fibers (2A) developed a helical crimp to be shrunk small.

The fibers constituting the nonwoven fabric were partially entangled in a lamination interface between both layers in a thickness direction of the nonwoven fabric, and a second fibrous layer including the fibers (2A) was raised on a side of the second fibrous layer between entanglements. The fibers (1) used were not thermally bonded with each other, and contact points between the fibers (2A) used and contact points between the fibers (2A) and the fibers (1) were bonded by heat fusion of the fibers (2A). Thickness of the nonwoven fabric was 3.2 mm.

Under conditions described in the Sonic bond processing above, a stretchable bulky nonwoven fabric was obtained by using a design of a round dot pattern having a diameter of 3 mm, and applying ultrasonic welding in a staggered arrangement having a pitch of 5 mm.

Example 2

A fibrous layer including fibers (1) and a fibrous layer including non-shrinkable fibers (2B-1) both as described in the Fibers above were prepared, respectively, and laminated to prepare a laminated fibrous layers, and a nonwoven fabric was prepared under conditions described in the Shrinking processing and formation of the nonwoven fabric. The fibers (1) developed a helical crimp to be significantly shrunk, and the non-shrinkable fibers (2B-1) were hardly shrunk.

The fibers constituting the nonwoven fabric were partially entangled in a lamination interface between both layers in a thickness direction of the nonwoven fabric, and a second fibrous layer including the fibers (2B-1) was raised on a side of the second fibrous layer between entanglements. The fibers (1) used were not thermally bonded with each other, and contact points between the non-shrinkable fibers (2B-1) used and contact points between the non-shrinkable fibers (2B-1) and the fibers (1) were bonded by heat fusion of the non-shrinkable fibers (2B-1). Thickness of the nonwoven fabric was 2.6 mm.

Under conditions described in the Sonic bond processing above, a stretchable bulky nonwoven fabric was obtained by using a design of a round dot pattern having a diameter of 3 mm, and applying ultrasonic welding in a staggered arrangement having a pitch of 5 mm.

Example 3

A fibrous layer including fibers (1) and a fibrous layer including fibers (2A) both as described in the Fibers above were prepared, and laminated to prepare a laminated fibrous layers, and a nonwoven fabric was prepared under conditions described in the Shrinking processing and formation of the nonwoven fabric. The fibers (1) developed a helical crimp to be significantly shrunk, and the non-shrinkable fibers (2A) developed a helical crimp to be shrunk weakly.

The fibers constituting the nonwoven fabric were partially entangled in a lamination interface between both layers in a thickness direction of the nonwoven fabric, and a second fibrous layer including the fibers (2A) was raised on a side of the second fibrous layer between entanglements. The fibers (1) used were not thermally bonded with each other, and contact points between the fibers (2A) used and contact points between the fibers (2A) and the fibers (1) were bonded by heat fusion of the fibers (2A). Thickness of the nonwoven fabric was 3.2 mm.

Under conditions described in the Sonic bond processing above, a stretchable bulky nonwoven fabric was obtained by changing an ultrasonic wave power period of time to 1 second, using a design of a round dot pattern having a diameter of 3 mm, and applying ultrasonic welding in a staggered arrangement having a pitch of 5 mm to excessively melt sites of the pattern design, completely melt the sites and open into the nonwoven fabric.

Comparative Example 1

A fibrous layer including fibers (1) and a fibrous layer including fibers (2A) both as described in the Fibers above were prepared, and laminated to prepare a laminated fibrous layers, and a nonwoven fabric was prepared under conditions described in the Shrinking processing and formation of the nonwoven fabric. Thickness of the nonwoven fabric was 3.2 mm.

Next, under conditions described in the Sonic bond processing above, a nonwoven fabric was obtained by using a design of a round dot pattern having a diameter of 0.8 mm and projections having a general height of 0.5 mm, and applying thermal embossing in a staggered arrangement having a pitch of 5 mm.

Comparative Example 2

A fibrous layer including fibers (1) and a fibrous layer including non-shrinkable fibers (2B-2) both as described in the Fibers above were prepared, and laminated to prepare a laminated fibrous layers.

Next, under conditions described in the Sonic bond processing above, a nonwoven fabric was obtained by changing a processing temperature to 124° C., using a design of a round dot pattern having a diameter of 0.8 mm and projections having a general height of 0.5 mm, and applying thermal embossing in a staggered arrangement having a pitch of 5 mm.

Then, shrinking processing was performed under conditions described in the Shrinking processing and formation of the nonwoven fabric. Thickness of the nonwoven fabric obtained was 1.3 mm.

Table 1 shows the results of a shrinkage ratio of the laminated fibrous layers, and tensile strength and the thickness of the nonwoven fabric in Examples and Comparative Examples.

TABLE 1

| | Shrinkage ratio of laminated layers (%) | | Tensile strength (N/5 cm) | | | | | Thickness (mm) |
|---|---|---|---|---|---|---|---|---|
| | | | 10% | 20% | 30% | 40% | 50% | |
| Example 1 | MD 75 | First time | 0.6 | 1.2 | 2.1 | 3.6 | 6.2 | 3 |
| | CD 40 | Second time | 0.4 | 0.9 | 1.8 | 3.2 | 6 | |
| Example 2 | MD 70 | First time | 0.5 | 1.4 | 2.8 | 4.2 | 8.5 | 2.3 |
| | CD 34 | Second time | 0.4 | 0.8 | 2 | 3.6 | 7.9 | |
| Example 3 | MD 75 | First time | 0.5 | 0.8 | 1.5 | 3.2 | 5.5 | 2.8 |
| | CD 40 | Second time | 0.2 | 0.5 | 1.1 | 3 | 4.9 | |
| Comparative Example 1 | MD 75 | First time | No stretchability | | | | | 0.4 |
| | CD 40 | Second time | | | | | | |

TABLE 1-continued

|  | Shrinkage ratio of laminated layers (%) | | Tensile strength (N/5 cm) | | | | | Thickness (mm) |
|---|---|---|---|---|---|---|---|---|
|  |  |  | 10% | 20% | 30% | 40% | 50% |  |
| Comparative Example 2 | MD 43 CD 10 | First time Second time | 5.6 −0.1 | 13.1 0.2 | 21.5 8.2 | 26.9 15.5 | 35.5 24.8 | 1.3 |

As shown in Table 1, the nonwoven fabrics in Examples 1 to 3 as obtained by the shrinking processing, the formation of the nonwoven fabric and the sonic bond processing had a thickness of 3.0 mm, 2.3 mm and 2.8 mm, respectively, and had a higher thickness as compared with the nonwoven fabrics in Comparative Examples 1 and 2. Thus, the nonwoven fabrics in Examples 1 to 3 had a high bulkiness and a good feeling, and showed a satisfactory stretchability.

In particular, the nonwoven fabric in Example 1 had a high shrinkage ratio and a high bulkiness because the potentially crimpable heat fusible conjugate fibers were used for the second fibrous layer. Moreover, the nonwoven fabric in Example 2 had an excellent tensile strength and a high flexibility because an elastomer resin was used for the second fibrous layer.

On the other hand, the nonwoven fabric in Comparative Example 1 as obtained by the formation of the nonwoven fabric and the thermal embossing had a thickness as low as 0.4 mm, and the fibers wholly bonded by an influence of a temperature of embossing rolls, and showed no stretchability.

Moreover, according to the nonwoven fabric in Comparative Example 2 as obtained by the thermal embossing and the shrinking processing, sections between connections protruded by shrinking between embossed connected parts, and a sufficient bulkiness was not obtained, and sections between the fibers wholly bonded by an influence of a temperature of the embossing rolls, and a nonwoven fabric having a very low stretchability was observed.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A stretchable bulky nonwoven fabric of the invention has an excellent stretchability, a high bulkiness and a good feeling. Thus, the stretchable bulky nonwoven fabric of the invention can be used for a surface material such as an absorption article, or a second layer in a hygiene product field, and a female material of a hook and loop fastener in an industrial material field, for example.

What is claimed is:

1. A stretchable bulky nonwoven fabric, wherein a first fibrous layer including fibers (1) is laminated with a second fibrous layer including heat fusible fibers (2) and having a MD shrinkage ratio that is lower by 5% or more than a MD shrinkage ratio of the first fibrous layer, the first fibrous layer and the second fibrous layer are integrated by partial entanglement of the fibers (1) included in the first fibrous layer and the fibers (2) included in the second fibrous layer at an interface between the first fibrous layer and the second fibrous layer in a thickness direction of the nonwoven fabric, wherein partial entanglement comprises entanglements and regions between the entanglements, the first fibrous layer is shrunk to form a structure in which the second fibrous layer is raised in a thickness direction at the regions between the entanglements, and sonic bond processing is partially applied to the first and second fibrous layers from a side of the second fibrous layer after the entanglement and shrinkage, wherein the entanglement and shrinkage are simultaneously achieved by increasing a temperature to a level in which helical crimps are developed in fibers (1) or to a higher level, and the fibers (1) develop helical crimps and shrink so as to tangle the fibers (2) included in the second fibrous layer.

2. The stretchable bulky nonwoven fabric according to claim 1, including concave parts foa med by the sonic bond processing, and convex parts formed by sites being not subjected to the sonic bond processing.

3. The stretchable bulky nonwoven fabric according to claim 2, wherein thickness of the convex parts is in the range of 1.0 to 5.0 mm.

4. The stretchable bulky nonwoven fabric according to claim 2, having apertures obtained by removing sites forming thickness of the concave parts.

5. The stretchable bulky nonwoven fabric according to claim 1, wherein the MD shrinkage ratio of the fibers (1) is 40% or more.

6. The stretchable bulky nonwoven fabric according to claim 1, wherein a method for manufacturing the stretchable bulky nonwoven fabric, comprises: laminating the first fibrous layer including the fibers (1) and the second fibrous layer including the heat fusible fibers (2) and having a MD shrinkage ratio that is lower by 5% or more than a MD shrinkage ratio of the first fibrous layer; integrating the first fibrous layer and the second fibrous layer by partial entanglement of the fibers (1) included in the first fibrous layer and the fibers (2) included in the second fibrous layer at an interface between the first fibrous layer and the second fibrous layer in a thickness direction of the nonwoven fabric, such that entanglements and regions between the entanglements are formed; shrinking the first fibrous layer to form a structure in which the second fibrous layer is raised in a thickness direction at the regions between the entanglements; and partially applying the sonic bond processing to the first and second fibrous layers from a side of the second fibrous layer after the entanglement and shrinkage, wherein the entanglement and shrinkage are simultaneously achieved by increasing a temperature to a level in which helical crimps are developed in fibers (1) or to a higher level, and the fibers (1) develop helical crimps and shrink so as to tangle the fibers (2) included in the second fibrous layer.

* * * * *